United States Patent
Katakura et al.

[19]

[11] Patent Number: 5,916,293
[45] Date of Patent: Jun. 29, 1999

[54] LOCKUP CONTROL APPARATUS

[75] Inventors: Shusaku Katakura; Satoshi Takizawa, both of Yokosuka; Hisaaki Toujima; Nobusuke Toukura, both of Yokohama; Hirofumi Shimizu, Yokosuka, all of Japan

[73] Assignee: Nissan Motor Co., Ltd., Yokohama, Japan

[21] Appl. No.: 08/789,613

[22] Filed: Jan. 24, 1997

[30] Foreign Application Priority Data

Jan. 25, 1996 [JP] Japan ................................. 8-010688
Jan. 25, 1996 [JP] Japan ................................. 8-010689

[51] Int. Cl.$^6$ ............................. G06G 7/70; F16D 33/00
[52] U.S. Cl. ............................. 701/67; 701/68; 192/331; 477/169
[58] Field of Search .................. 701/51, 52, 53, 701/54, 67, 68; 477/64, 169, 175, 118, 62, 166, 168, 78, 63; 192/3.3, 3.31, 21.5, 103 C, 4 A, 48.9

[56] References Cited

U.S. PATENT DOCUMENTS

| | | | |
|---|---|---|---|
| 5,092,435 | 3/1992 | Sone et al. ................................. | 701/67 |
| 5,283,738 | 2/1994 | Schwab et al. ............................ | 701/68 |
| 5,323,320 | 6/1994 | Hathaway et al. ........................ | 701/67 |
| 5,335,174 | 8/1994 | Kohno et al. .............................. | 701/68 |
| 5,445,016 | 8/1995 | Neigebauer ............................... | 701/67 |
| 5,573,473 | 11/1996 | Asayama et al. .......................... | 477/63 |
| 5,667,458 | 9/1997 | Narita et al. .............................. | 477/169 |
| 5,719,768 | 2/1998 | Tashiro et al. ............................. | 701/68 |
| 5,721,682 | 2/1998 | Arai et al. ................................. | 701/68 |
| 5,733,223 | 3/1998 | Matsubara et al. ....................... | 477/175 |

OTHER PUBLICATIONS

"Service Manual for Nissan Full–Range Electronically Controlled Automatic Transmission 5E–AT, RE5R01A Type", Nissan Motor Co., Ltd., Jun. (1989), pp. A14–A15 and A43–A45.

*Primary Examiner*—Jacques H. Louis-Jacques
*Attorney, Agent, or Firm*—Foley & Lardner

[57] ABSTRACT

A lockup control apparatus for use with an automotive vehicle having an engine, an automatic transmission and a torque converter operable in a coast lockup mode having a lockup capacity to provide a controlled degree of mechanical connection between the engine and the automatic transmission when the vehicle is coasting. The apparatus employs a memory having a desired value for the lockup capacity stored therein. A first signal is produced when a slip rotation occurs in the torque converter and a second signal is produced when the coast lockup mode is released. The desired lockup capacity value is updated with a greater value in response to the first signal. A frequency at which either of the first and second signals occurs is measured. The desired lockup capacity value is updated with a smaller value when the measured frequency exceeds a reference value. The lockup capacity is controlled based on the desired lockup capacity value stored in the memory to retain the frequency of occurrence of the first signal in a predetermined range.

34 Claims, 7 Drawing Sheets

LOCKUP CONTROL APPARATUS

BACKGROUND OF THE INVENTION

The present invention relates to a lockup control apparatus and method for a vehicle drive train control system.

The vehicle drive train includes an engine, a transmission having an input shaft and an output shaft, a torque converter, between the engine and the transmission, including a lockup clutch hydraulically engaged to various degrees for establishing various torque transmitting capacities in transmitting torque between the engine and the input shaft of the transmission in response to a control signal, and a control unit having stored therein data, prepared for keeping the lockup clutch engaged during coasting of the vehicle, for developing the control signal in response to the stored data during coasting of the vehicle.

For improved fuel economy, it is desired to keep the lockup clutch engaged during coasting of the vehicle without occurrence of engine stall. Theoretically, if torque transmitting capacity of the lockup clutch is lower or smaller than a lower limit value, there occurs considerable amount of slip in the look-up clutch, while, if torque transmitting capacity of the look-up clutch is higher than or greater than an upper limit value, there occurs an unacceptable delay in response time from a moment when a look-up release command is issued to a moment when disengagement of the look-up clutch is completed. Thus, it is desired to keep torque transmitting capacity within a predetermined window or range defined between or by the lower and upper limit values. This window should be narrow and extends in the neighborhood of the lower limit value for quick response of the lockup clutch to the lockup release command during coasting of the vehicle.

During coasting of the vehicle, the input shaft of the transmission drives the engine, while, during driving of the vehicle, the engine drives the input shaft of the transmission. The torque converter with the lockup clutch is well known. One example is disclosed in pages A-14 to A-15 and A-43 to A-45 of a publication entitled "Service Manual For Nissan Full-range Electronically Controlled Automatic Transmission 5E-AT, RE5R01A Type" published by Nissan Motor Co., Ltd. in June 1989. This known torque converter comprises a converter cover drivingly connected to the engine, a pump impeller connected to the converter cover, a turbine runner situated between the converter cover and the pump impeller, a stator situated between the pump impeller and turbine runner, and a lockup piston connected to the turbine runner for rotation therewith. The turbine runner is drivingly connected to the input shaft of the transmission. During release of the lockup clutch, a hydraulic medium, namely a converter activating pressurized hydraulic fluid, is supplied from a lockup control valve to a first passage opening to a space between the converter cover and the lockup piston, separating a clutch facing of the lockup piston from the converter cover. The hydraulic medium supplied to this space flows through spaces between the pump impeller, turbine runner and stator and flows out of the torque converter through a second passage opening into the pump impeller. Under this condition, the lockup clutch is disengaged or engagement of the lockup clutch is released. To establish engagement of the lockup clutch, a flow of hydraulic medium is changed. Hydraulic medium is supplied to the second passage and the first passage is connected to a drainage, allowing discharge of hydraulic medium from the space between the cover and the lockup piston. Rate of discharge of hydraulic medium is affected by centrifugal force imparted to the hydraulic medium within the torque converter. With the structure of the converter, speed of rotation the lockup piston does not exceed speed of rotation of the converter cover during driving of the vehicle where the engine drives the vehicle load. However, during coasting of the vehicle where the engine is driven by the vehicle load, speed of rotation of the lockup piston is higher than speed of rotation of the converter cover unless the lockup clutch is engaged. The lockup control valve is operatively coupled with a lockup control means or element in the form of a lockup solenoid. The duty of the lockup solenoid is adjusted in response to a control signal indicative of a desired duty. The control signal is developed by a control unit. For control of torque transmitting capacity of the lockup clutch to keep engagement of the lockup clutch during coasting operation, if the stored data of the control unit is modified in a direction to cause an increase in torque transmitting capacity of the lockup clutch each time after it is determined that there is occurrence of slip during coasting of the vehicle, actual torque transmitting capacity tends to increase toward or beyond the above-mentioned upper limit value. Thus, this control strategy is not satisfactory.

An object of the present invention is to provide a lock-up control strategy for control of torque transmitting capacity of the lockup clutch of the torque converter during coasting of the vehicle wherein torque transmitting capacity of the look-up clutch is adjusted to keep an improved response of the lockup clutch to a lockup release command with good fuel economy maintained during coasting of the vehicle.

SUMMARY OF THE INVENTION

The present invention uses a vehicle drive train control system including an engine, a transmission having an input shaft and an output shaft, a torque converter, between the engine and the transmission, including a lockup clutch hydraulically engaged to various degrees for establishing various torque transmitting capacities in transmitting torque between the engine and the input shaft of the transmission in response to a control signal, and a control unit having stored therein data, prepared for keeping the lockup clutch engaged during coasting of the vehicle, for developing the control signal in response to the stored data during coasting of the vehicle.

The improved control unit modifies the data in such a first direction as to cause an increase in torque transmitting capacity of the lockup clutch when there occurs slip in the lockup clutch during coasting of the vehicle and counts the number of occurrence of slip in the lockup clutch having occurred during coasting of the vehicle. Then, the control unit counts the number of occurrence of release of the lockup clutch from engagement of the lockup clutch that occurs during coasting operation. The control unit modifies the data in a second direction opposite to said first direction after a sum of the counted numbers has satisfied a predetermined relationship with a predetermined value. The control unit develops the control signal based on the modified data for the subsequent control of torque transmitting capacity of the lockup clutch during coasting of the vehicle, adjusting torque transmitting capacity of the lockup clutch in a manner to restrain an increase in torque transmitting capacity of the lockup clutch with the number of occurrence of slip in the lockup clutch kept sufficiently small.

According to another aspect of the present invention, the improved control unit confirms engagement of the lockup clutch during driving of the vehicle. Then, the control unit executes a learning to modify the stored data in a manner to cause a change in torque transmitting capacity of the lockup clutch during coasting of the vehicle which occurs immediately after the control unit has confirmed engagement of the lockup clutch during driving of the vehicle. The control unit fails to execute the learning to leave the data unmodified during coasting of the vehicle which occurs after the control unit has failed to confirm engagement of the lockup clutch during driving of the vehicle.

According to still another aspect of the present invention, there is provided a lockup control method for a vehicle drive train control system including an engine, a transmission having an input shaft and an output shaft, a torque converter, between the engine and the transmission, including a lockup clutch hydraulically engaged to various degrees for establishing various torque transmitting capacities in transmitting torque between the engine and the input shaft of the transmission in response to a control signal, and a control unit having stored therein data, prepared for keeping the lockup clutch engaged during coasting of the vehicle, for developing the control signal in response to the stored data during coasting of the vehicle, the lockup control method comprising the steps of:

modifying the data in such a first direction as to cause an increase in torque transmitting capacity of the lockup clutch when there occurs slip in the lockup clutch during coasting of the vehicle and counts the number of occurrence of slip in the lockup clutch having occurred during coasting of the vehicle;

counting the number of occurrence of release of the lockup clutch from engagement of the lockup clutch that occurs during coasting operation;

modifying the data in a second direction opposite to said first direction after a sum of the counted numbers has satisfied a predetermined relationship with a predetermined value; and developing the control signal based on the modified data for the subsequent control of torque transmitting capacity of the lockup clutch during coasting of the vehicle, adjusting torque transmitting capacity of the lockup clutch in a manner to restrain an increase in torque transmitting capacity of the lockup clutch with the number of occurrence of slip in the lockup clutch kept sufficiently small.

According to a specific aspect of the present invention, there is provided a lockup control method for a vehicle drive train including an engine, a transmission having an input shaft and an output shaft, and a torque converter, between the engine and the transmission, including a lockup clutch hydraulically engaged to various degrees for establishing various torque transmitting capacities in transmitting torque between the engine and the input shaft of the transmission in response to a control signal developed based on a data prepared for keeping the lockup clutch engaged during coasting of the vehicle, the control method comprising the steps of:

determining occurrence of release of the lockup clutch from engagement of the lockup clutch that occurs during coasting of the vehicle;

determining occurrence of slip in the lockup clutch during coasting of the vehicle; and decreasing the data when a sum of result of counting the number of occurrence of slip in the lockup clutch during coasting of the vehicle and a result of counting the number of occurrence of release of the lockup clutch from engagement of the lockup clutch that occurs during coasting of the vehicle becomes greater than a predetermined value;

increasing the data upon occurrence of slip in the lockup clutch during coasting of the vehicle; and developing the control signal based on the modified data.

According to still another aspect of the present invention, there is provided a lockup control method for a vehicle drive train control system including an engine, a transmission having an input shaft and an output shaft, a torque converter, between the engine and the transmission, including a lockup clutch hydraulically engaged to various degrees for establishing various torque transmitting capacities in transmitting torque between the engine and the input shaft of the transmission in response to control signal, and a control unit having stored therein data, prepared for keeping the lockup clutch engaged during coasting of the vehicle, for developing the control signal in response to the stored data during coasting of the vehicle, the lockup control method comprising the steps of:

confirming engagement of the lockup clutch during driving of the vehicle and providing a confirmation signal;

executing a learning to modify the stored data in a manner to cause a change in torque transmitting capacity of the lockup clutch during coasting of the vehicle in response to presence of said confirmation signal; and failing to execute said learning to leave the data unmodified during coasting of the vehicle in response to absence of said confirmation signal.

According to further aspect of the present invention, there is provided a control method for a vehicle drive train including an engine, a transmission having an input shaft and an output shaft, and a torque converter, between the engine and the transmission, including a lockup clutch hydraulically engaged to various degrees for establishing various torque transmitting capacities in transmitting torque between the engine and the input shaft of the transmission in response to a control signal developed based on a data prepared for keeping the lockup clutch engaged during coasting of the vehicle, the lockup control method comprising the steps of:

determining whether or not there is occurrence of driving of the vehicle in response to a relation between a measure of torque produced by the engine and a measure of load which the vehicle drive train is subject to;

confirming that there is occurrence of engagement of the lockup clutch when it is determined that a measure of the torque transmitting capacity of the lockup clutch meets a demand for torque transmitting capacity required during driving of the vehicle and at the same time it is determined that a measure of slip in the lockup clutch is in the neighborhood of a predetermined slip amount, thereby allowing execution of a learning to modify the data; and executing said learning to modify the data in a manner to cause a change in torque transmitting capacity of the lockup clutch during coasting of the vehicle which occurs immediately after confirmation of occurrence of engagement of the lockup clutch during driving of the vehicle.

The measure of torque of the engine may be one of a measure of flow rate of intake air to the engine, and a measure of fuel amount per fuel injection to the engine. The measure of load which the vehicle drive train is subject to may be a measure of vehicle load derived from a measure of speed of the vehicle.

The relation between the measure of torque produced by the engine and the measure of load which the vehicle drive train is subject to may be a difference therebetween and the difference may be derived from one of a measure of flow rate of intake air to the engine, a measure of fuel amount per injection to the engine and a measure of degree of opening of a throttle of the engine.

In the determining step, it is determined that there is occurrence of driving of the vehicle when said measure of torque of the engine is greater than a measure of load which the vehicle drive train is subject to. Alternatively, it is determined that there is occurrence of driving of the vehicle when a difference between said measure of torque of the engine and said measure of load which the vehicle drive train is subject to has exceeded a vehicle load representative threshold value derived from a measure of speed of the vehicle toward a side where the torque of the engine surpasses the load which the vehicle drive train is subject to.

It may be determined that the measure of the torque transmitting capacity of the lockup clutch meets said demand when the measure of the torque transmitting capacity is greater than a predetermined value.

The measure of slip in the lockup clutch may be a measure of one of a difference between a speed of the engine and a speed of the input shaft of the transmission and a ratio therebetween.

In the confirming step, it may be confirmed that there is occurrence of engagement of the lockup clutch when a determination that the measure of torque transmitting capacity of the lockup clutch has met the demand and a determination that the measure of slip in the lockup clutch is in the neighborhood of the predetermined slip amount continuously repeated for a predetermined period of time.

The confirmation by the confirming step that there is occurrence of engagement of the lockup clutch may be reset during lockup control modes other than a control mode where a complete engagement of the look-up clutch is intended. Alternatively, this confirmation may be reset upon a determination that there is occurrence of release from a complete engagement of the lockup clutch. Alternatively, the confirmation may be reset upon completion of execution of the learning, thereby to restrain the number of execution of the learning during coasting of the vehicle.

DETAILED DESCRIPTION OF THE INVENTION

Figure 1:
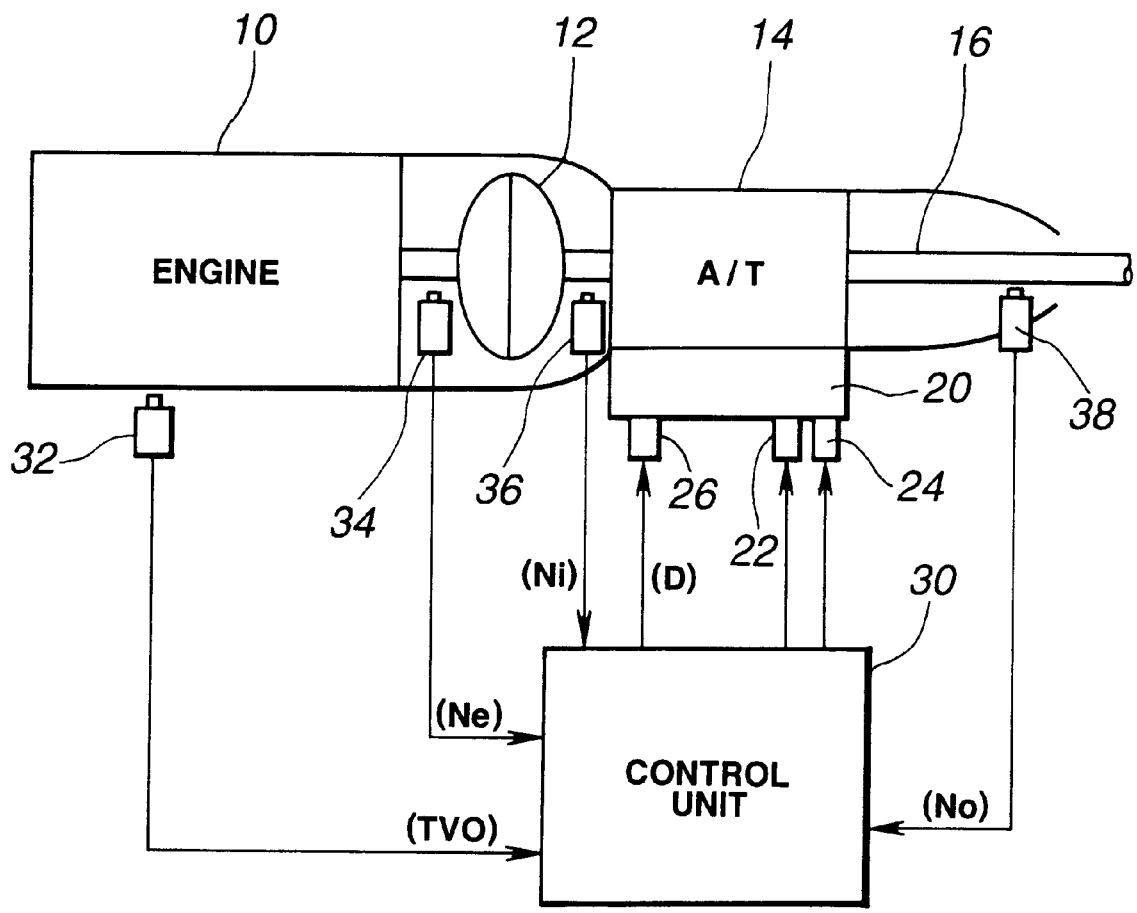
FIG. 1 is a block diagram of a vehicle drive train of an automotive vehicle.

With reference to the drawings and in particular to FIG. 1, there is shown a schematic block diagram of a lockup control apparatus embodying the invention. The lockup control apparatus is used with an automotive vehicle having an engine 10 from which a drive is transmitted through a torque converter (T/C) 12 to an automatic transmission (A/T) 14. The automatic transmission 19 having various friction elements each of which operates on a working fluid pressure supplied thereto in an engaged and released state. The friction elements are selectively engaged and released, according to a shift schedule, to selectively establish a desired transmission gear ratio at which the drive is outputted to an output shaft 16. The friction elements, such as clutches, brakes and servos, are pressurized or vented so as to cause the transmission gear ratio to change through the operation of the shift control valves 22 and 24 included in a control valve unit 20. The control valve unit 20 also includes a lockup control valve 26 operable on a lockup command signal having a desired duty radio (duty) to place the torque converter 12 in a lockup mode L/U where a mechanical connection is completed between the engine 10 and the automatic transmission 14 or in a converter mode T/C where a hydrodynamic driving connection exists between the engine 10 and the automatic transmission 14. For example, the lockup clutch is opened, unlocked, released or disengaged to operate the torque converter 12 in the converter mode when the duty cycle of the lockup command signal applied to the lockup control solenoid 26 is 0% and it is closed, locked, applied or engaged to operate the torque converter 12 in the lockup mode when the duty ratio of the lockup command signal applied to the lockup control solenoid 26 is 100%. It is also possible to control the lockup clutch to have a desired lockup capacity by adjusting the duty ratio of the lockup command signal.

The operation of the solenoid operated control valves 22, 24 and 26 is controlled by a control unit 30 based on various conditions including engine throttle position TV0, engine output shaft speed Ne, torque converter output shaft speed Ni and transmission output shaft speed No. Thus, an engine throttle position sensor 32, an engine output shaft speed sensor 34, a torque converter output shaft speed sensor 36 and a transmission output shaft speed sensor 38 are connected to the control unit 30. The engine throttle position sensor 32 is associated with the engine throttle valve and it produces a voltage signal proportional to the degree TV0 of rotation of the engine throttle valve. The engine output shaft speed sensor 34 is associated with the engine distributor and it produces a pulse signal of a repetitive rate proportional to the engine output shaft speed Ne. The torque converter output shaft speed sensor 36 is provided at a position for sensing the speed Ni of rotation of the transmission input shaft. The transmission output shaft speed sensor 38 is located at a position for sensing the speed No of rotation of the transmission output shaft.

The control unit 30 employs a digital computer which includes a central processing unit (CPU), a random access memory (RAM), a read only memory (ROM) and an input/output control unit (I/O). The central processing unit communicates with the rest of the computer via a data bus. The input/output control unit includes an analog-to-digital converter which receives analog signals from the various sensors and it converts the received signals into corresponding digital signals for application of the central processing unit. The read only memory contains the programs for operating the central processing unit and further appropriate data, for example, shift schedules and lockup schedules, in look-up tables used for gear-shift and lockup control.

Figure 2A:
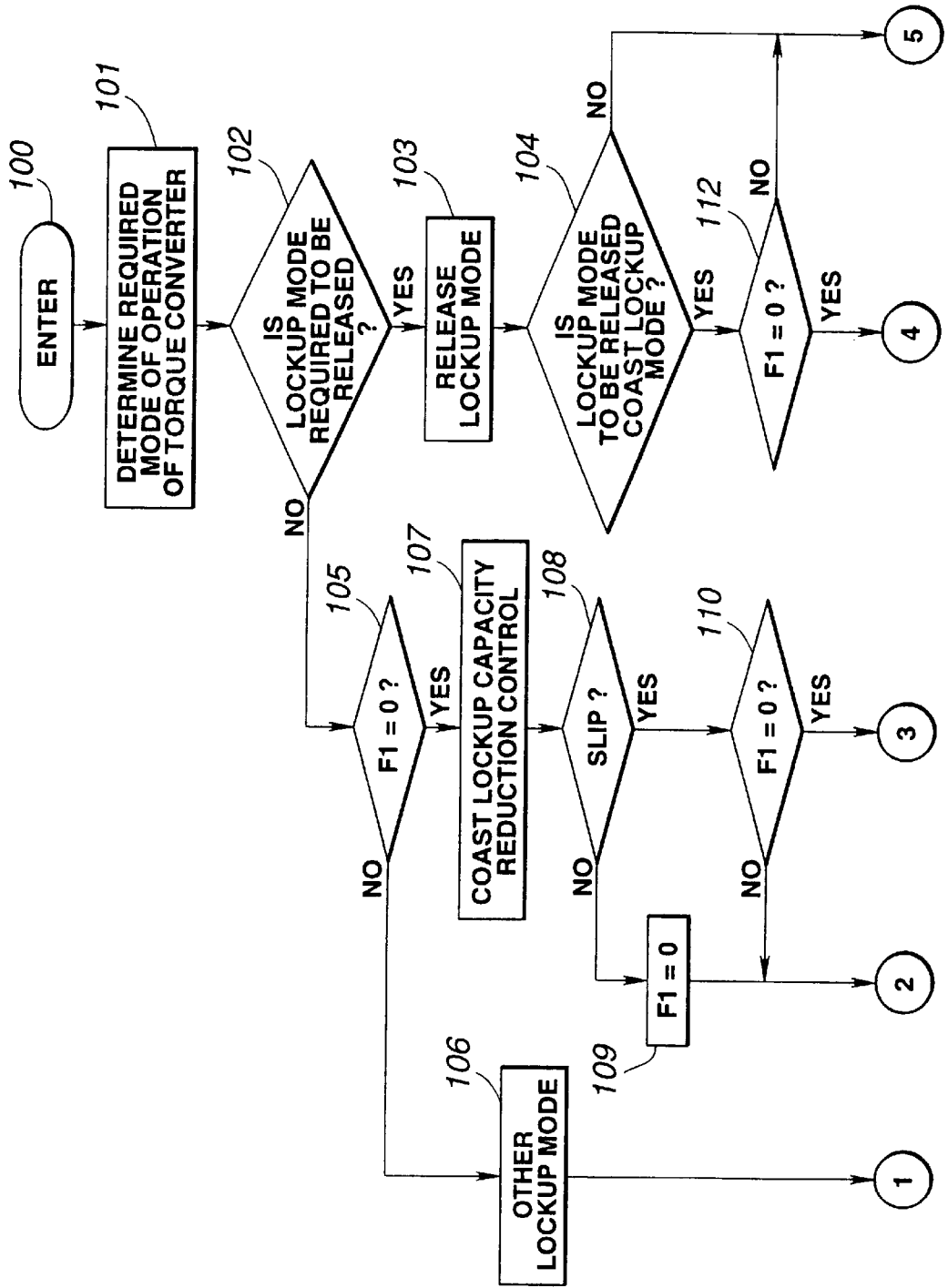
FIGS. 2A and 2B are a flow diagram of a control routine of the preferred implementation of the present invention.
Figure 2B:
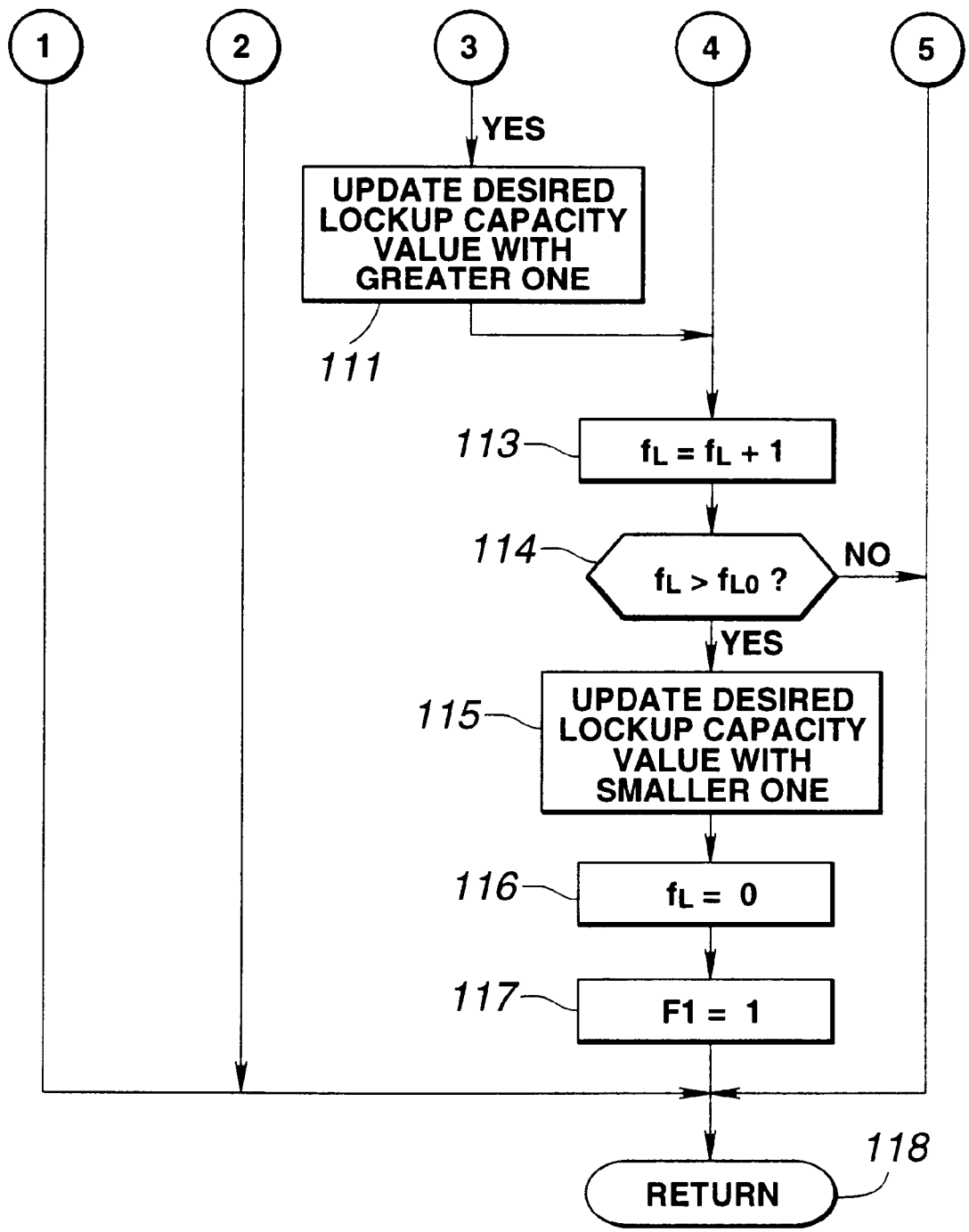

FIGS. 2(a) and 2(b) are flow diagrams illustrating the programming of the digital computer. The computer program is entered at the point 100. At the point 101 in the program, a desired mode of operation of the torque converter 12 is determined from the lockup schedule programmed into the computer. This lockup schedule defines the desired torque converter operation mode as a function of vehicle speed V and engine throttle position TV0. At the point 102, a determination is made as to whether or not the lockup mode of operation of the torque converter 12 is to be released. This determination is made by a comparison of the current torque converter operation mode with the desired torque converter operation mode determined at the point 101. If the answer to this question is "yes", then the program proceeds to the point 103, a command is produced to cause the lockup control solenoid 26 to release the existing lockup mode. Otherwise, the program proceeds to the point 105.

At the point 104 in the program, a determination is made as to whether or not the released lockup mode is a coast lockup mode. The coast lockup mode is a lockup mode specified in a vehicle coasting condition, It is to be understood that coasting is the condition in which the engine throttle is closed while the vehicle is traveling with the engine still coupled to the drive shaft and in which condition the momentum of the vehicle keeps the engine running at speeds greater than idle. The vehicle coasting condition may be detected when the sensed engine throttle position is less than a predetermined value. If the answer to this question is "yes", then the program proceeds to the point 112. Otherwise, the program proceeds to the point 118 where the program is returned to the point 101.

At the point 105, a determination is made as to whether or not the coast lockup mode is required. If the answer to this question is "yes", then the program proceeds to the point 107. Otherwise, the program proceeds to the point 106 where a command is produced to cause the lockup control valve 26 to operate the torque converter 12 in the other lockup mode. For example, the duty ratio of the lockup command signal to the lockup control valve 26 is set at 100% to provide the maximum lockup capacity. Following this, the program proceeds to the point 118. At the point 107, a command is produced to cause the lockup control valve 26 to reduce the lockup capacity to a predetermined value (lockup capacity reduction control). It is to be understood that the control unit 30 may be arranged to reduce the lockup capacity to a desired value calculated from a look-up table which is stored in the computer memory to define the desired value as a function of gear ratio selected in the vehicle coasting condition. This lockup capacity reduction control is effective to avoid an engine stall which may result from a rapid vehicle deceleration caused when a change is produced from the lockup mode to the converter mode in the presence of an emergency brake. The lockup mode is released with no delay so as to avoid an engine stall even if a rapid deceleration occurs in the coast lockup mode.

At the point 108 in the program, a determination is made as to whether of not a slip rotation occurs in the torque converter 12. This determination is made based on the difference between the engine speed Ne and the transmission input shaft speed Ni or the ratio of the engine speed Ne with respect to the transmission input shaft speed Ni. If the answer to this question is "yes", then the program proceeds to the point 110. Otherwise, the program proceeds to the point 109 where a flag F1 is cleared to zero. The flag F1 is set to indicate that the lockup capacity has been learned. Following this, the program proceeds to the point 118. At the point 110 in the program, the flag F1 has been cleared. If the answer to this question is "yes", then the program proceeds to the point 111. Otherwise, the program proceeds to the point 118. At the point 111, the learned lockup capacity value is increased by a predetermined value. The initial learned lockup capacity value corresponds to the lockup capacity specified in the coast lockup mode. Following this, the program proceeds to the point 113.

At the point 112 in the program, a determination is made as to whether of not the flag F1 is cleared. If the answer to this question is "yes", the program proceeds to the point 118. Otherwise, the program proceeds to the point 113 where a counter is incremented by one step. This counter accumulates a count $f_L$ corresponding to the frequency of the opportunity of learning the lockup capacity. At the point 114, a determination is made as to whether or not the count $f_L$ is greater than a predetermined value $f_{LO}$. If the frequency $f_D$ is set at a smaller value, the frequency at which the learned lockup capacity value is decreased will increase so as to correct the coast lockup capacity in a direction to increase the tendency toward the slip rotation in the torque converter 12. If the frequency $f_D$ is set at a greater value, the frequency at which the learned lockup capacity value is decreased will decrease so as to correct the coast lockup capacity in a direction to decrease the tendency toward the slip rotation in the torque converter 12. If the answer to the question inputted to the point 114 is "no", then the program proceeds to the point 118. Otherwise, the program proceeds to the point 115 where the learned lockup capacity value is decreased by a predetermined value. At the point 116, the count $f_L$ of the counter is cleared to zero. At the point 117, the flag F1 is set at 1. Following this, the program proceeds to the point 118.

Figure 3:
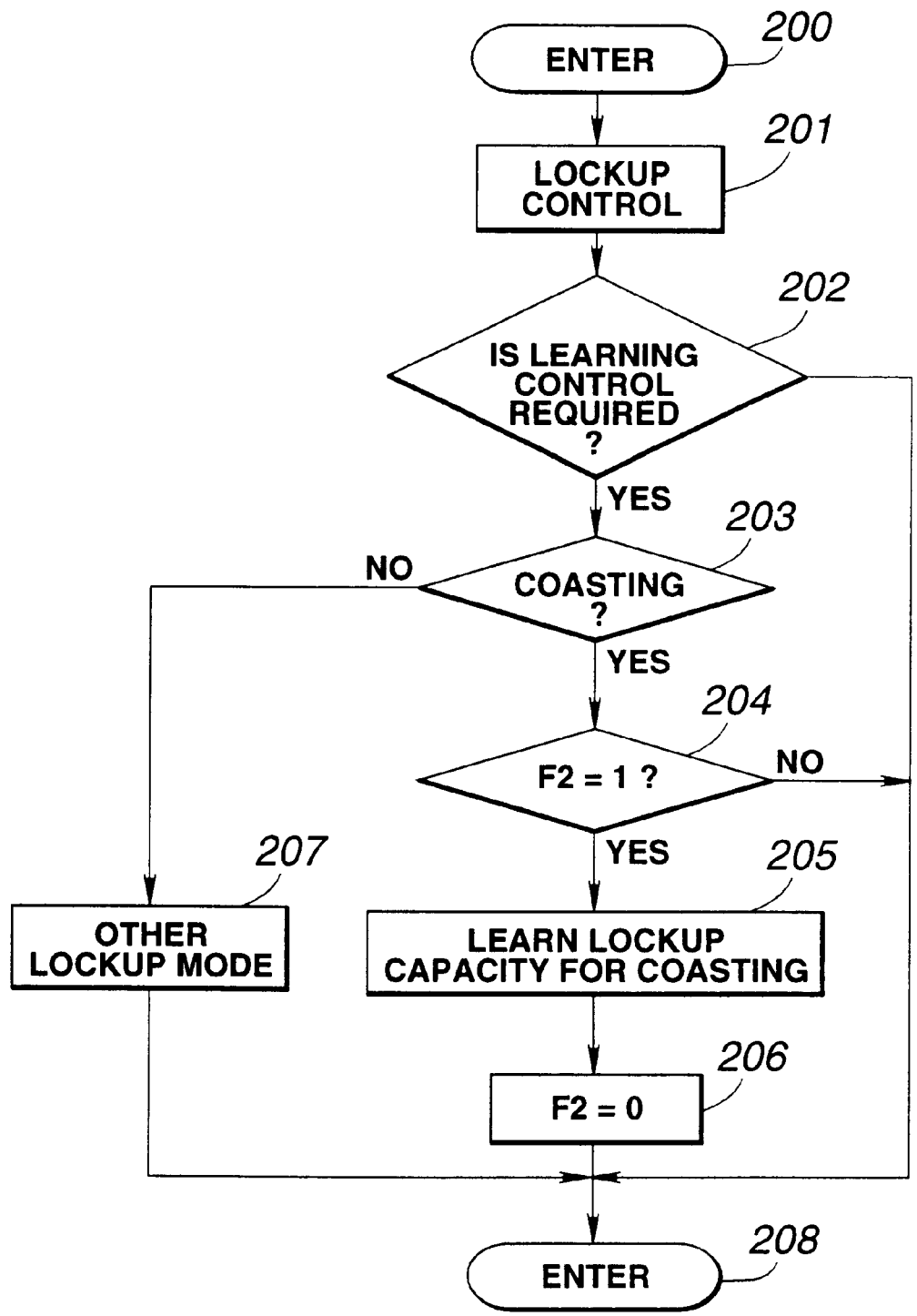
FIG. 3 is a flow diagram of a control routine of another preferred implementation of the present invention.

FIG. 3 is a flow diagram illustrating another form of the programming of the digital computer as it is used for lockup capacity control. The computer program is entered at the point 200. At the point 201 in the program, a command is produced to operate the torque converter 12 in the lockup mode. This command is produced with the use of a lockup schedule, stored in the form of a look-up table, which defines a desired one of torque converter operation modes in terms of vehicle speed V and engine throttle position TV0. At the point 202, a determination is made as to whether or not a learning control is required. If the answer to this question is "no", then the program proceeds to the point 208 where the program is returned to the point 201. Otherwise, the program proceeds to another determination step at the point 203. This determination is as to whether or not the vehicle is coasting. It may be judged that the vehicle is coasting when the engine throttle position TV0 is less than a predetermined value or when the idle switch is closed. If the answer to this question is "yes", then the program proceeds to the point 204. Otherwise, the program proceeds to the point 207 where the lockup capacity is learned for use in controlling the torque converter 12 when the drive range (D) is selected. Following this, the program proceeds to the point 208.

At the point 204 in the program, a determination is made as to whether or not a flag F2 has been set. This flag F2 is set when the lockup mode of operation of the torque converter 12 is confirmed in the drive range just before this vehicle coasting condition occurs. If the answer to this question is "yes", then the program proceeds to the point 205. Otherwise, the program proceeds to the point 208. The answer to the question inputted at the point 204 is "no" except for the complete lockup mode, that is, when the torque converter is operating in the slip lockup mode or in the converter mode, or during a change to the complete lockup mode or from the complete lockup mode. At the point 205 in the program, the lockup capacity is read and used to update the last lockup capacity value stored in the computer memory. This learned lockup capacity value may be used for the coast lockup capacity reduction control described in connection with the point 107 of the flow diagram of 2A. At the point 206, the flag F2 is cleared to zero. This step is effective to limit the number of times the lockup capacity is learned during one coast lockup mode of operation of the torque converter 12. Following this, the program proceeds to the point 208.

Figure 4A:
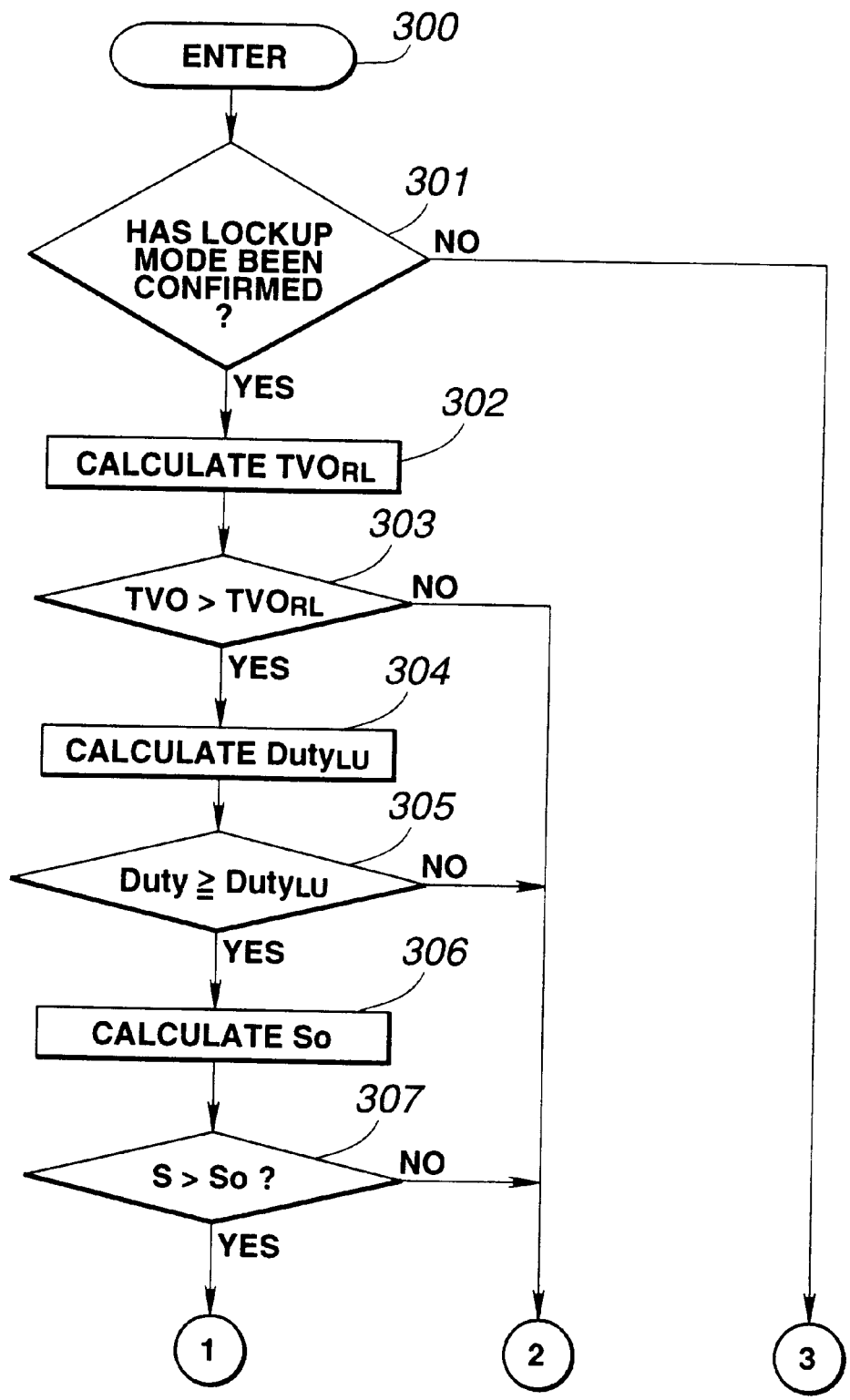
FIGS. 4A and 4B are a flow diagram of a control routine of the preferred implementation of confirmation of occurrence of engagement of the lockup clutch during driving of the vehicle.
Figure 4B:
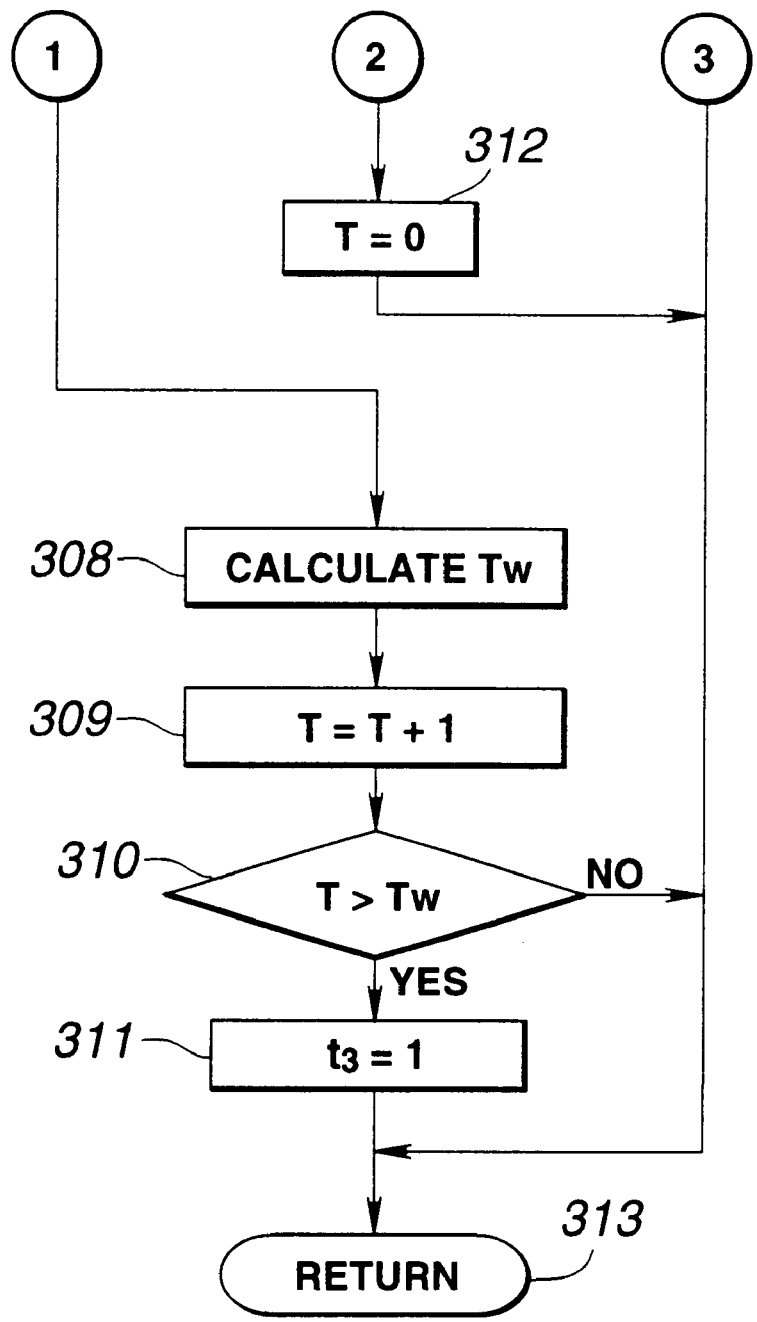

FIGS. 4A and 4B are detailed flow diagrams illustrating the programming of the digital computer as it is used to confirm the lockup mode of operation of the torque converter 12 is confirmed. The computer program is entered at the point 300. At the point 301 in the program, a determination is made as to whether or not a flag F3 has been set. This flag F3 is set when the lockup mode of operation of the torque converter 12 is confirmed. If the answer to this question is "no", then the program proceeds to the point 313 where the program is returned to the point 301. Otherwise, the program proceeds to the point 302 where an R/L corresponding engine throttle position $TV0_{RL}$ is calculated from a look-up table programmed into the computer. This look-up table defines the R/L corresponding engine throttle position $TV0_{RL}$ as a function of vehicle speed V. At the point 303 the sensed engine throttle position TV0 is greater then the R/L corresponding engine throttle position $TV0_{RL}$. If the answer to this question is "no", then the program proceeds to the point 312. Otherwise, it means that the drive range is selected and the program proceeds to the point 304. That is, it is detected that the drive range is selected when a first value indicative of the engine torque exceeds a second value indicative of the vehicle load. The first value may be one of the amount of air permitted to enter the engine, the amount of fuel metered to the engine and the engine throttle position. The second value may be the vehicle load derived from the vehicle speed. At the point 304, a duty ratio $Duty_{LO}$ required for the torque converter to operate in the lockup mode is calculated from a look-up table programmed into the computer. This look-up tabe defines ratio $Duty_{LU}$ as a function of engine throttle position TV0, vehicle speed V and gear ratio. At the point 305, a determination is made as to whether or not the current duty ratio Duty is equal to or greater than the calculated duty ratio $Duty_{LU}$. If the answer to this question is "no", then the program proceeds to the point 312. Otherwise, it means that the current duty ratio Duty is sufficient to ensure the lockup mode of operation of the torque converter 12 and the program proceeds to the point 306 where the central processing unit calculates a threshold slip rotation value So below which it is judged that the lockup mode of operation of the torque converter 12 has been completed from a look-up table programmed into the computer. This look-up table defines the threshold slip rotation value So as a function of vehicle speed V engine speed Ne and gear ratio. At the point 307, a determination is made as to whether or not the current value S of the slip rotation in the torque converter 12 is less than the threshold slip rotation value So. The current slip rotation value S may be calculated based on a difference between the sensed engine speed Ne and the sensed transmission input shaft speed Ni. If the answer to this question is "no", then the program proceeds to the point 312. Otherwise, it means that the lockup mode of operation of the torque converter 12 is confirmed and the program proceeds to the point 308 where the waiting time Tw required for the confirmation of the lockup mode of operation of the torque converter 12 is calculated from a look-up table programmed into the computer. This look-up table defines the waiting time Tw as a function of engine speed Ne, vehicle speed V and slip rotation S. At the point 309, the timer has its count T incremented by one step. The timer accumulates a count T corresponding to the period of time during which the lockup mode of operation of the torque converter 12 is confirmed continuously. At the point 311, a determination is made as to whether or not the count T of the timer is greater than the calculated waiting time value Tw. If the answer to this question is "no", then the program proceeds to the point 313. Otherwise, the program proceeds to the point 312 where the flag F3 is set to indicate that the lockup mode of operation of the torque converter 12 is confirmed. Following this, the program proceeds to the point 313. At the point 312 in the program, the timer is reset to zero. Following this, the program proceeds to the point 313.

According to this form of the programming of the digital computer, it is possible to provide an accurate judgment that the slip rotation occurs in the torque converter 12 because of an insufficient lockup capacity rather than an incomplete lockup. This is effective to improve the learning control accuracy.

Figure 5:
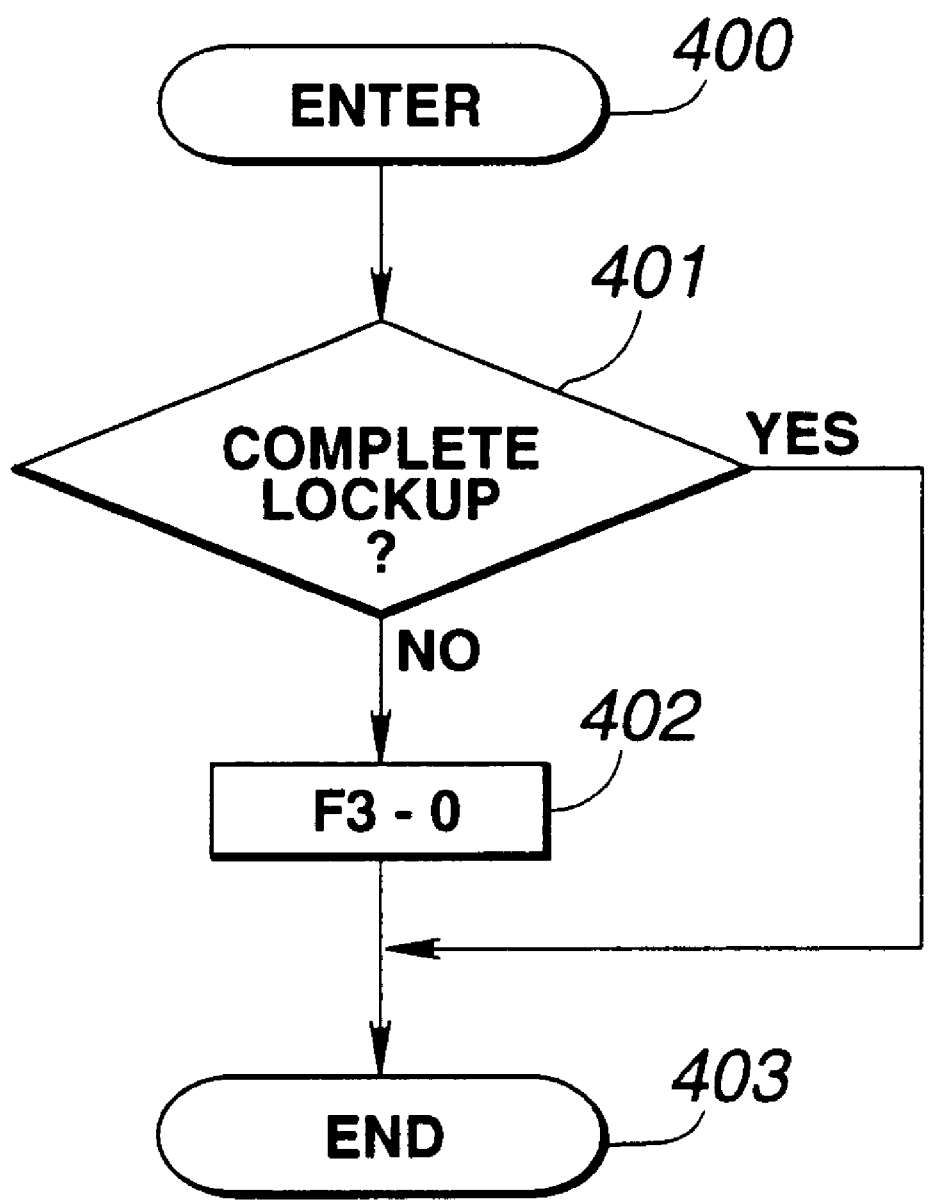
FIG. 5 is a flow diagram of a routine of the preferred implementation of resetting the confirmation.

FIG. 5 is a flow diagram illustrating the programming of the digital computer as it is used to clear the flag F3. The computer program is entered at the point 400 when the lockup control is terminated. At the point 401, a determination is made as to whether or not the lockup is completed. If the answer to this question is "yes", then the program proceeds to the end point 403. Otherwise, it means that the lockup is incomplete and the program proceeds to the point 402 where the flag F3 is cleared. Following this, the program proceeds to the end point 403.

What is claimed is:

1. In a vehicle drive train control system including an engine, a transmission having an input shaft and an output shaft, a torque converter, between the engine and the transmission, including a lockup clutch hydraulically engaged to various degrees for establishing various torque transmitting capacities in transmitting torque between the engine and the input shaft of the transmission in response to a control signal, and a control unit having stored therein data, prepared for keeping the lockup clutch engaged ruing coasting of the vehicle, for developing the control signal in response to the stored data during coasting of the vehicle, the improvement wherein:

the control unit modifies the data in such a first direction as to cause an increase in torque transmitting capacity of the lockup clutch when there occurs slip in the lockup clutch during coasting of the vehicle and counts the number of occurrence of slip in the lockup clutch having occurred during coasting of the vehicle;

the control unit counts the number of occurrence of release of the lockup clutch from engagement of the lockup clutch that occurs during coasting operation;

the control unit modifies the data in a second direction opposite to said first direction after a sum of the counted numbers has satisfied a predetermined relationship with a predetermined value; and the control unit develops the control signal based on the modified data for the subsequent control of torque transmitting capacity of the lockup clutch during coasting of the vehicle, adjusting torque transmitting capacity of the lockup clutch in a manner to restrain an increase in torque transmitting capacity of the lockup clutch with the number of occurrence of slip in the lockup clutch kept sufficiently small.

2. In a vehicle drive train including an engine, a transmission having an input shaft and an output shaft, and a torque converter, between the engine and the transmission, including a lockup clutch hydraulically engaged to various degrees for establishing various torque transmitting capacities in transmitting torque between the engine and the input shaft of the transmission in response to a control signal developed based on a data prepared for keeping the lockup clutch engaged during coasting of the vehicle, a lockup control apparatus for controlling the torque transmitting capacity of the lockup clutch during coasting of the vehicle, comprising:

lockup means for regulating hydraulic medium within the torque converter in response to the control signal to adjust torque transmitting capacity of the lockup clutch during coasting of the vehicle;

means for determining occurrence of release of the lockup clutch from engagement of the lockup clutch that occurs during coasting of the vehicle;

means for determining occurrence of slip in the lockup clutch during coasting of the vehicle; and learning means for modifying the data prepared for keeping the lockup clutch engaged during coasting of the vehicle, said learning means including means for decreasing the data and means for increasing the data, said data decreasing means being operative to decrease the data each time when a sum of a result of counting the number of occurrence of slip in the lockup clutch during coasting of the vehicle and a result of counting the number of occurrence of release of engagement of the lockup clutch during coasting of the vehicle becomes greater than a predetermined value, said data increasing means being operative to increase the data when said slip occurrence determining means determines occurrence of slip in the lockup clutch during coasting of the vehicle; and means for developing the control signal based on the modified data and applying the control signal to said lockup means.

3. A lockup control apparatus as claimed in claim 2, wherein said lockup means is operative to keep the torque transmitting capacity sufficiently low enough to allow quick response of the lockup clutch to a release command from engagement of the lockup clutch.

4. A lockup control apparatus as claimed in claim 2,
wherein said data decreasing means is operative to decrease the data by a first predetermined amount, said data increasing means is operative to increase the data by a second predetermined amount, and wherein said first and second predetermined amounts and said predetermined value are cooperating factors influencing the number of occurrences of slip in the lockup clutch during coasting of the vehicle.

5. A lockup control apparatus as claimed in claim 2, wherein said slip in lockup clutch occurrence determining means is operative to compare one of a difference and a speed ratio between a speed of the engine and a speed of the input shaft of the transmission with a predetermined value in determining occurrence of slip in the lockup clutch.

6. In a vehicle drive train control system including an engine, a transmission having an input shaft and an output shaft, a torque converter, between the engine and the transmission, including a lockup clutch hydraulically engaged to various degrees for establishing various torque transmitting capacities in transmitting torque between the engine and the input shaft of the transmission in response to a control signal, and a control unit having stored therein data, prepared for keeping the lockup clutch engaged during coasting of the vehicle, for developing the control signal in response to the stored data during coasting of the vehicle, the improvement wherein:

the control unit confirms engagement of the lockup clutch during driving of the vehicle;

the control unit executes a learning to modify the stored data in a manner to cause a change in torque transmitting capacity of the lockup clutch during coasting of the vehicle which occurs immediately after the control unit has confirmed engagement of the lockup clutch during driving of the vehicle; and the control unit fails to execute said learning to leave the data unmodified during coasting of the vehicle which occurs after the control unit has failed to confirm engagement of the lockup clutch during driving of the vehicle.

7. In a vehicle drive train including an engine, a transmission having an input shaft and an output shaft, and a torque converter, between the engine and the transmission, including a lockup clutch hydraulically engaged to various degrees for establishing various torque transmitting capacities in transmitting torque between the engine and the input shaft of the transmission in response to a control signal developed based on a data prepared for keeping the lockup clutch engaged during coasting of the vehicle, a lockup control apparatus for controlling the torque transmitting capacity of the lockup clutch during coasting of the vehicle, comprising:

means for determining whether or not there is occurrence of driving of the vehicle in response to a relation between a measure of torque produced by the engine and a measure of load which the vehicle drive train is subject to;

means for confirming that there is occurrence of engagement of the lockup clutch when it is determined that a measure of the torque transmitting capacity of the lockup clutch meets a demand for torque transmitting capacity required during driving of the vehicle and at the same time it is determined that a measure of slip in the lockup clutch is in the neighborhood of a predetermined slip amount, thereby allowing execution of a learning to modify the data; and means for executing said learning to modify the data in a manner to cause a change in torque transmitting capacity of the lockup clutch during coasting of the vehicle which occurs immediately after said confirming means has confirmed occurrence of engagement of the lockup clutch during driving of the vehicle.

8. A lockup control apparatus as claimed in claim 7, wherein said measure of torque of the engine is one of a measure of flow rate of intake air to the engine, and a measure of fuel amount per fuel injection to the engine.

9. A lockup control apparatus as claimed in claim 7, wherein said measure of load which the vehicle drive train is subject to is a measure of vehicle load derived from a measure of speed of the vehicle.

10. A lockup control apparatus as claimed in claim 7,
wherein said relation between the measure of torque produced by the engine and the measure of load which the vehicle drive train is subject to is a difference therebetween and wherein said difference is derived from one of a measure of flow rate of intake air to the engine, a measure of fuel amount per injection to the engine and a measure of degree of opening of a throttle of the engine.

11. A lockup control apparatus as claimed in claim 7, wherein said determining means determines that there is occurrence of driving of the vehicle when said measure of torque of the engine is greater than a measure of load which the vehicle drive train is subject to.

12. A lockup control apparatus as claimed in claim 7, wherein said determining means determines that there is occurrence of driving of the vehicle when a difference between said measure of torque of the engine and said measure of load which the vehicle drive train is subject to has exceeded a vehicle load representative threshold value derived from a measure of speed to the vehicle toward a side where the torque of the engine surpasses the load which the vehicle drive train is subject to.

13. A lockup control apparatus as claimed in claim 7, wherein it is determined that said measure of the torque transmitting capacity of the lockup clutch meets said demand when said measure of the torque transmitting capacity is greater than a predetermined value.

14. A lockup control apparatus as claimed in claim 7, wherein said measure of slip in the lockup clutch is a measure of one of a difference between a speed of the engine and a speed of the input shaft of the transmission and a ratio therebetween.

15. A lockup control apparatus as claimed in claim 7, wherein said confirming means confirms that there is occurrence of engagement of the lockup clutch when a determination that the measure of torque transmitting capacity of the lockup clutch has met the demand and a determination that the measure of slip in the lockup clutch is in the neighborhood of the predetermined slip amount continuously repeated for a predetermined period of time.

16. A lockup control apparatus as claimed in claim 7, further comprising:
 means for resetting said confirmation by said confirming means that there is occurrence of engagement of the lockup clutch during lockup control modes other than a control mode where a complete engagement of the lock-up clutch is intended.

17. A lockup control apparatus as claimed in claim 7, further comprising:
 means for resetting said confirmation by said confirming means that there is occurrence of engagement of the lockup clutch upon a determination that there is occurrence of release from a complete engagement of the lockup clutch.

18. A lockup control apparatus as claimed in claim 7, further comprising:
 means for resetting said confirmation by said confirming means that there is occurrence of engagement of the lockup clutch upon completion of execution of the learning, thereby to restrain the number of execution of the learning during coasting of the vehicle.

19. In a vehicle drive train control system including an engine, a transmission having an input shaft and an output shaft, a torque converter, between the engine and the transmission, including a lockup clutch, a lockup element operable in various states in response to a control signal to establish various torque transmitting capacities of the lockup clutch in transmitting torque between the engine and the input shaft of the transmission, and a control unit having stored therein data, prepared for keeping the lockup clutch engaged during coasting of the vehicle, for developing the control signal in response to the stored data during coasting of the vehicle, the improvement wherein:
 the control unit confirms engagement of the lockup clutch during driving of the vehicle;
 the control unit modifies the data in such a first direction as to cause an increase in torque transmitting capacity of the lockup clutch when there occurs slip in the lockup clutch during coasting of the vehicle which subsequently occurs immediately after the control unit has confirmed engagement of the lockup clutch during driving of the vehicle and counts the number of occurrence of slip in the lockup clutch;
 the control unit counts the number of occurrence of release of the lockup clutch from engagement of the lockup clutch that occurs during coasting operation which occurs immediately after the control unit has confirmed engagement of the lockup clutch during driving of the vehicle;
 the control unit modifies the data in a second direction opposite to said first direction when a sum of the counted numbers is greater than a predetermined value; and
 the control unit develope the control signal based on the modified data and applies the control signal to the lockup element to adjust torque transmitting capacity of the lockup clutch during coasting of the vehicle.

20. A lockup control method for a vehicle drive train control system including an enginge, a transmission having an input shaft and an output shaft, a torque converter, between the engine and the transmission, including a lockup clutch hydraulically engaged to various degrees for establishing various torque transmission capacities in transmitting torque between the engine and the input shaft of the transmission in response to a control signal, and a control unit having stored therein data, prepared for keeping the lockup clutch engaged during coasting of the vehicle, for developing the control signal in response to the stored data during coasting of the vehicle, the lockup control method comprising the steps of:
 modifying the data in such a first direction as to cause an increase in torque transmitting capacity of the lockup clutch when there occurs slip in the lockup clutch during coasting of the vehicle and counts the number of occurrence of slip in the lockup clutch having occurred during coasting of the vehicle;
 counting the number of occurrence of release of the lockup clutch from engagement of the lockup clutch that occurs during coasting operation;
 modifying the data in a second direction opposite to said first direction after a sum of the counted numbers has satisfied a predetermined relationship with a predetermined value; and
 developing the control signal based on the modified data for the subsequent control of torque transmitting capacity of the lockup clutch during coasting of the vehicle, adjusting torque transmitting capacity of the loclup clutch in a manner to restrain an increase in torque transmitting capacity of the lockup clutch kept sufficiently small.

21. A lockup control method for a vehicle drive train including an engine, transmission having an input shagt and an output shaft, and a torque converter, between the engine and the transmission, including a lockup clutch hydraulically engaged to various degrees for establishing various torque transmitting capacities in transmitting torque between the engine and the input shaft of the transmission in response to a control signal developed bsed on a data prepared for keeping the lockup clutch engaged during coasting of the vehicle, the control method comprising the steps of:
 determining occurrence of release of the lockup clutch from engagement of the lockup clutch that occurs during coasting of the vehicle;
 determining occurrence of slip in the lockup clutch during coasting of the vehicle; and
 decreasing the data when a sum of a result of counting the number of occurrence of slip in the lockup clutch during coasting of the vehicle and a result of counting the number of occurrence of release of the lockup clutch from engagement of the lockup clutch that occurs during coasting of the vehicle becomes greater than a predetermined value;

increasing the data upon occurrence of slip in the lockup clutch during coasting of the vehicle; and developing the control signal based on the modified data.

22. A lockup control method for a vehicle drive train control system including an engine, a transmission having an input shaft and an output shaft, a torque converter, between the engine and the transmission, including a lockup clutch hydraulically engaged to various degrees for establishing various torque transmitting capacities in transmitting torque between the engine and the input shaft of the transmission in response to a control signal, and a control unit having stored therein data, prepared for keeping the lockup clutch engaged during coasting of the vehicle, for developing the control signal in response to the stored data during coasting of the vehicle, the lockup control method comprising the steps of:

confirming engagement of the lockup clutch during driving of the vehicle and providing a confirmation signal;

executing a learning to modify the stored data in a manner to cause a change in torque transmitting capacity of the lockup clutch during coasting of the vehicle in response to presence of said confirmation signal; and failing to execute said learning to leave the data unmodified during coasting of the vehicle in response to absence of said confirmation signal.

23. A lockup control method for a vehicle drive train including an enginge, a transmission having an input shaft and an output shaft, and a torque converter, between the engine and the transmission, including a lockup clutch hydraulically engaged to various degrees for establishing various torque transmitting capacities in transmitting torque between the engine and the input shaft of the transmission in response to a control signal developed based on a data prepared for keeping the lockup control method comprising the steps of:

determining whether or not there is occurrence of driving of the vehicle in response to a relation between a measured of torque produced by the engine and a measure of load which the vehicle drive train is subject to;

confirming that there is occurrence of engagement of the lockup clutch when it is determined that a measure of the torque transmitting capacity of the lockup clutch meets a demand for transmitting capacity required during driving of the vehicle and at the same time it is determined that a measure of slip in the lockup clutch is in the neighborhood of a predetermined slip amount, thereby allowing execution of a learning to modify the data; and executing said learning to modify the data in a manner to cause a change in torque transmitting capacity of the lockup clutch during coasting of the vehcile which occurs immediately after confirmation of occurrence of engagement of the lockup clutch during driving of the vehicle.

24. A lockup control method as claimed in claim 23, wherein said measure of torque of the engine is one of a measure of flow rate of intake air to the engine, and a measure of fuel amount per fuel injection to the engine.

25. A lockup control method as claimed in claim 23, wherein said measure of load which the vehicle drive train is subject to is a measure of vehicle load derived from a measure of speed of the vehicle.

26. A lockup control method as claimed in claim 23, wherein said relation between the measure of torque produced by the engine and the measure of load which the vehicle drive train is subject to is a difference therebetween and wherein said difference is derived form one of a measure of flow rate of intake air to the engine, a measure of feul amount per injection to the engine and a measure of degree of opening of a throttle of the engine.

27. A lockup control method as claimed in claim 23, wherein, in said determing step, it is determined that there is occurrence of driving of the vehicle when said measure of torque of the engine is greater than a measure of load which the vehicle drive train is subject to.

28. A lockup control method as claimed in claim 23, wherein, in said determining step, it is determined that there is occurrence of driving of the vehicle when a difference between said measure of torque of the engine and said measure of load which the vehicle drive train is subject to has exceeded a vehicle load representative threshold value derived from a measure of speed of the vehicle toward a side where the torque of the engine surpasses the load which the vehicle drive train is subject to.

29. A lockup control method as claimed in claim 23, wherein it is determined that said measure of the torque transmitting capacity of the lockup clutch meets said demand when said measure of the torque transmitting capacity is greater than a predetermined value.

30. A lockup control method as claimed in claim 23, wherein said measure of slip in the lockup clutch is a measure of one of a difference between a speed of the engine and a speed of the input shaft of the transmission and a ratio therebetween.

31. A lockup control method as claimed in claime 23, wherein, in said confirming step, it is confirmed that there is occurrence of engagement of the lockup clutch when a determination that the measure of torque transmitting capacity of the lockup clutch has met the demand adn a determination that the neighborhood of the predetermined slip amount continuously repeated for a predetermined period of time.

32. A lockup control method as claimed in claim 23, further comprising the step of:

resetting the confirmation by said confirming step that there is occurrence of engagement of the lockup clutch during lockup control modes other than a control mode where a complete engagement of the lock-up clutch is intended.

33. A lockup control method as claimed in claim 23, further comprising the step of:

resetting the confirmation by said confirming step that there is occurrence of engagement of the lockup clutch upon a determination that there is occurrence of release from a complete engagement of the lockp clutch.

34. A lockup control method as claimed in claim 23, further comprising the step of:

resetting the confirmation by said confirming step that there is occurrence of engagement of the lockup clutch upon completion of execution of the learning, thereby to restrain the number of execution of the learning during coasting of the vehicle.

* * * * *